UNITED STATES PATENT OFFICE.

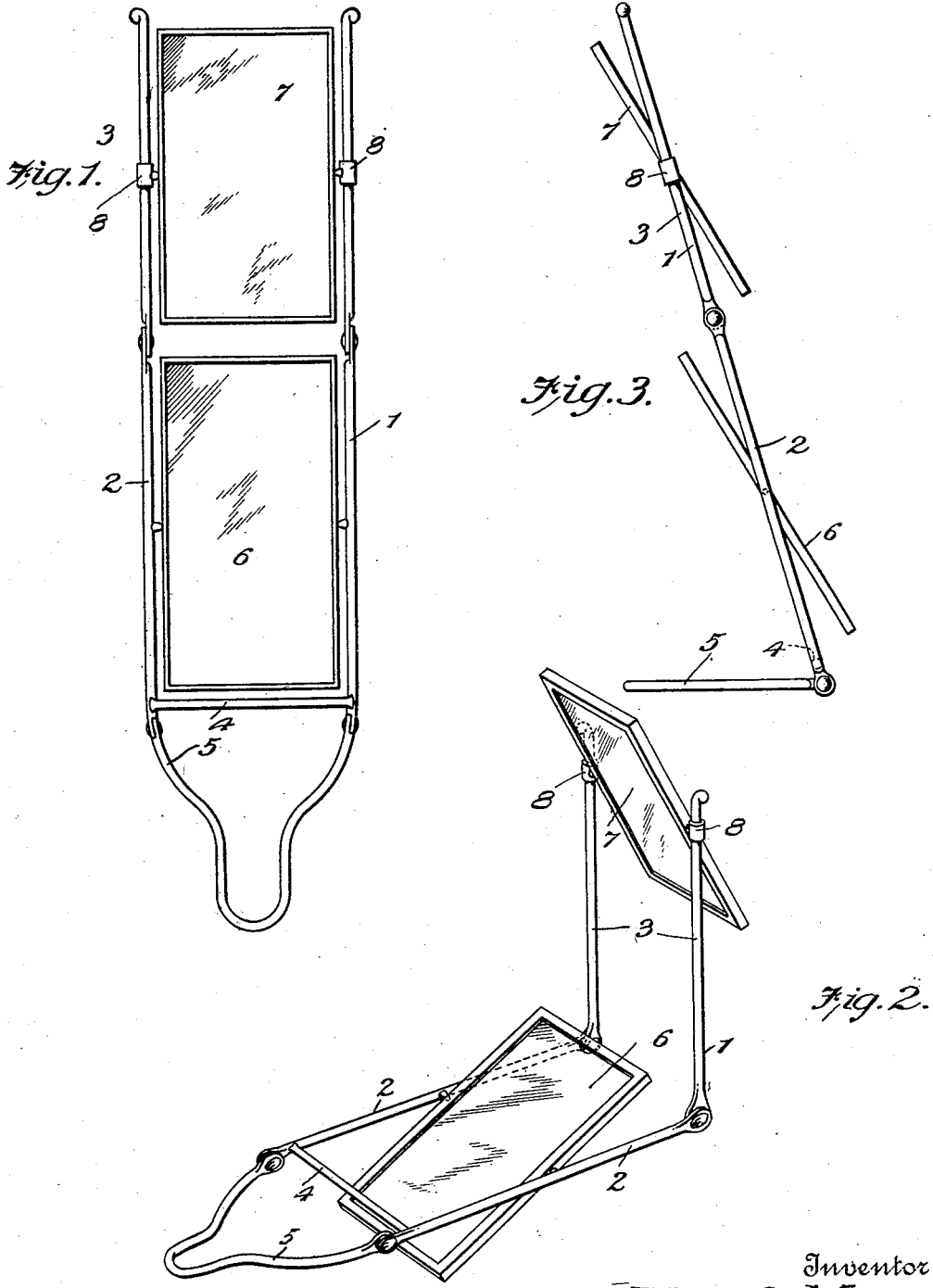

JULIUS C. MAY, OF CHICAGO, ILLINOIS.

PORTABLE FOLDING MIRROR.

No. 862,833. Specification of Letters Patent. Patented Aug. 6, 1907.

Application filed May 23, 1907. Serial No. 375,266.

*To all whom it may concern:*

Be it known that I, JULIUS C. MAY, a citizen of the United States, residing at Chicago, in the county of Cook and State of Illinois, have invented certain new and useful Improvements in Portable Folding Mirrors; and I do declare the following to be a full, clear, and exact description of the invention, such as will enable others skilled in the art to which it appertains to make and use the same.

This invention relates to improvements in portable folding mirrors.

The object of the invention is to provide an arrangement of hand mirrors, by means of which objects which cannot be seen by one mirror will be reflected into the other, where they may be readily seen.

A further object is to provide a mirror of this character which may be readily folded to enable the same to be carried in the pocket or in a hand-bag.

With these objects in view, the invention consists of certain novel features of construction, combination and arrangement of parts as will be more fully described and particularly pointed out in the appended claims.

In the accompanying drawings, Figure 1 is a plan view of the invention, showing the parts in position for use as an ordinary hand glass; Fig. 2 is a perspective view of the same, showing the mirrors arranged in such position that objects will be reflected by one into the other; and Fig. 3 is a side view showing the handle of the mirrors folded back to form a foot or support for the same.

Referring more particularly to the drawings, 1 denotes a pair of side bars which are hingedly connected together midway between their ends to form inner and outer mirror-supporting sections, 2 and 3. The bars 1 of the inner section 2, are connected together at their inner ends by a cross bar 4, and to said inner ends is hingedly connected a handle, 5, which is preferably formed of a single piece of wire bent in the shape shown.

Between the bars 2 of the inner section is pivotally mounted a rectangularly-shaped mirror, 6, and between the side bars of the section 3 is pivotally and adjustably mounted an outer mirror 7. The outer mirror 7 is adjustably connected to the side bars in any suitable manner, the same being here shown as connected by means of bands or collars, 8, which are adapted to engage the side bars with sufficient friction to hold the mirror at any desired position on said bars, thus providing for the arrangement of the mirror 7 in the position shown in Fig. 1, or in Fig. 2 of the drawing. The mirror 7 is pivotally engaged with the bands or collars 8 to permit the same to be swung to any desired angle.

By hinging the side bars of the outer section 3 to the bars of the inner section 2, said sections may be turned at right angles to each other, thus enabling the mirror to be used in a number of different positions. When the mirrors are arranged as shown in Fig. 1, the device is adapted for use as an ordinary hand glass. When the mirrors are arranged as shown in Fig. 2, objects which cannot be seen with the mirrors in the position shown in Fig. 1, will be reflected by the upper mirror into the lower mirror, where they may be readily observed. When the mirrors are arranged in this position, it is possible to see the top and back of one's head from the reflection of the upper mirror into the lower mirror. When it is desired to place the mirrors upon a table or other support in position for use, the handle 5 is folded back as shown in Fig. 3, and serves as a support or foot to hold the mirror at any desired angle.

From the foregoing description, taken in connection with the accompanying drawings, the construction and operation of the invention may be readily understood without requiring a more extended explanation.

Various changes in the form, proportion and the minor details of construction may be resorted to without departing from the principle or sacrificing any of the advantages of this invention as defined in the appended claims.

Having thus fully described my invention, what I claim as new and desire to secure by Letters-Patent, is:

1. A portable folding mirror, comprising side bars hingedly connected midway between their ends to form inner and outer mirror supporting sections, mirrors pivotally mounted between said bars in said inner and outer sections, and a handle pivotally connected to the inner ends of said bars, substantially as described.

2. A mirror of the character described, comprising side bars hingedly connected midway between their ends to form inner and outer mirror supporting sections, a mirror pivotally mounted between said bars of said inner section, an outer mirror pivotally and adjustably mounted between the bars of the outer section, and a handle hingedly connected to the inner end of said bars, substantially as described.

3. A mirror of the character described, comprising parallel side bars hingedly connected midway between their ends to form inner and outer mirror supporting sections, a cross bar to connect the inner ends of the bars forming said inner section, a handle pivotally connected to said inner ends of the bars and adapted to turn back to form a support, a mirror pivotally mounted between the bars of said inner section, bands or collars having a sliding frictional engagement on the bars of said outer section, and an outer mirror pivotally mounted on said bands or collars, substantially as described.

In testimony whereof I have hereunto set my hand in presence of two subscribing witnesses.

JULIUS C. MAY.

Witnesses:
A. W. PETRI,
BEN COHEN.